United States Patent [19]

Okubo et al.

[11] Patent Number: 5,454,053
[45] Date of Patent: Sep. 26, 1995

[54] METHOD FOR COMPRESSING DYNAMIC RANGES OF IMAGES

[75] Inventors: Takeshi Okubo; Kazuo Shimura, both of Kanagawa, Japan

[73] Assignee: Fuji Photo Film Co., Ltd., Kanagawa, Japan

[21] Appl. No.: 229,217

[22] Filed: Apr. 18, 1994

[30] Foreign Application Priority Data

Apr. 19, 1993 [JP] Japan ..................... 5-091276

[51] Int. Cl.$^6$ .................................... G06K 9/40
[52] U.S. Cl. ............................. 382/270; 382/132
[58] Field of Search .................. 382/54, 6, 41; 378/62, 98.2, 98.12; 250/370.08, 370.69; 364/413.13

[56] References Cited

U.S. PATENT DOCUMENTS

| | | | |
|---|---|---|---|
| 4,302,672 | 11/1981 | Kato et al. ........................... | 382/54 |
| 4,315,318 | 2/1982 | Kato et al. ........................... | 382/54 |
| 4,571,635 | 2/1986 | Mahmoodi et al. ................. | 382/54 |

OTHER PUBLICATIONS

"Journal of Japanese Society of Radiological Technology" vol. 45, No. 8, p. 1030, Aug. 1989.

*Primary Examiner*—Yon J. Couso
*Attorney, Agent, or Firm*—Sughrue, Mion, Zinn, Macpeak & Seas

[57] ABSTRACT

With a method for compressing a dynamic range of an image, the value of an unsharp mask signal Sus corresponding to each of picture elements in an original image is calculated by averaging the values of image signal components of an original image signal Sorg representing the original image, which image signal components represent the picture elements belonging to a predetermined region surrounding each of the picture elements. The original image signal Sorg is then processed with the formula $$Sproc = Sorg + f_1(Sus)$$

where $f_1(Sus)$ represents a function, the value of which decreases monotonously as the value of the unsharp mask signal Sus increases, and the values of a processed image signal Sproc representing an image having a narrower dynamic range than the original image is thereby generated. The method comprises the steps of calculating the contrast of the original image signal Sorg from the values of the original image signal Sorg, and determining a signal range, to which the function $f_1(Sus)$ is applied, and/or the level of the value of the function $f_1(Sus)$ in accordance with the level of the contrast of the original image signal Sorg.

16 Claims, 9 Drawing Sheets

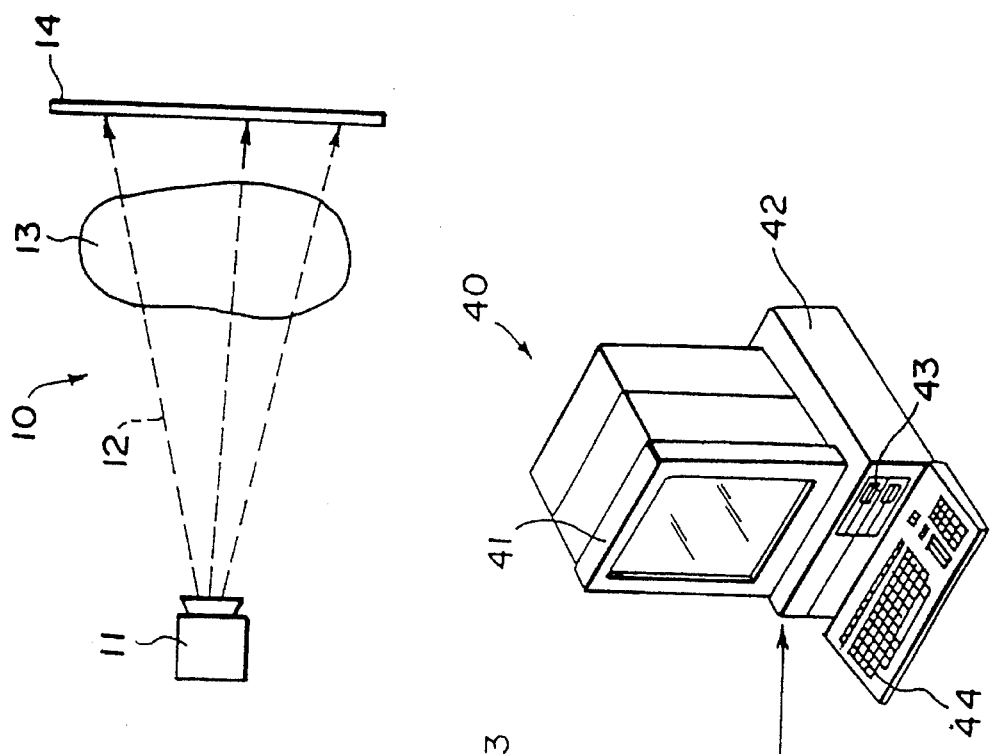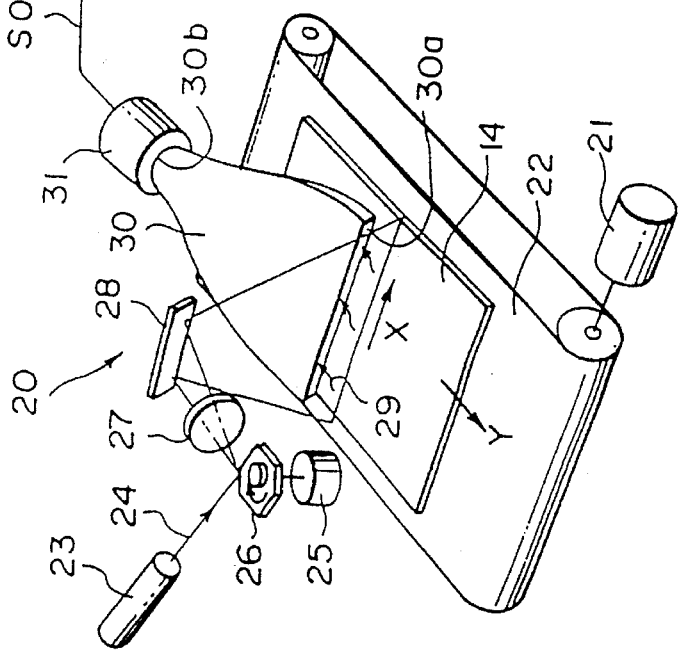

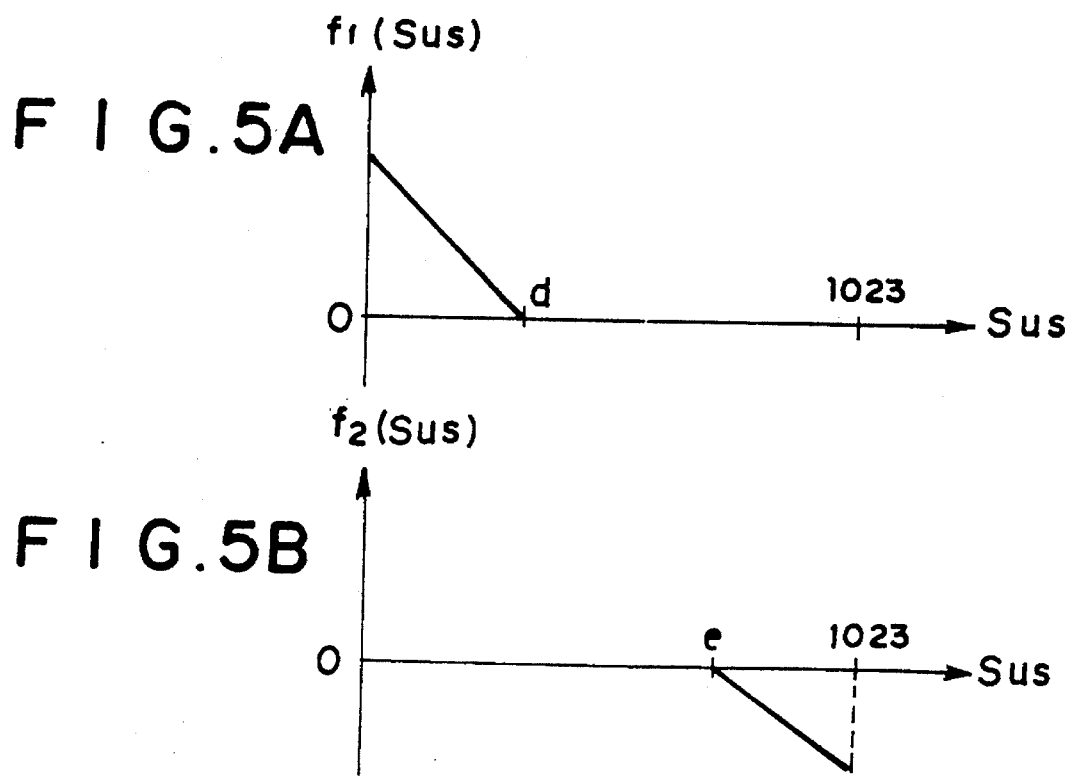
FIG. 5A
FIG. 5B
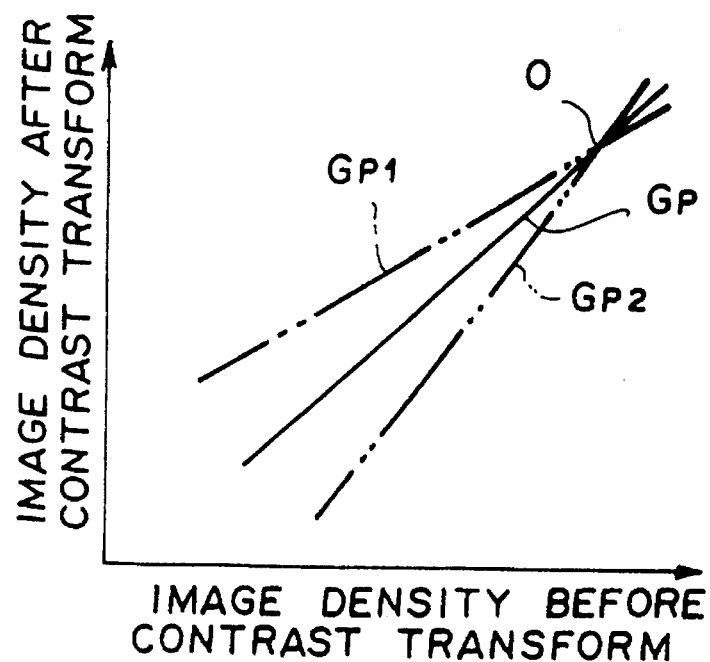
FIG. 6

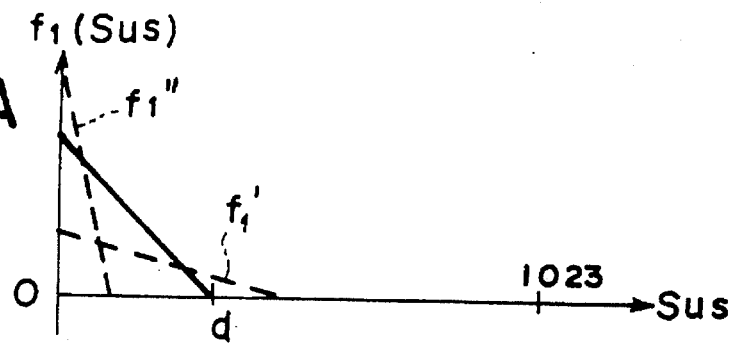
FIG. 7A
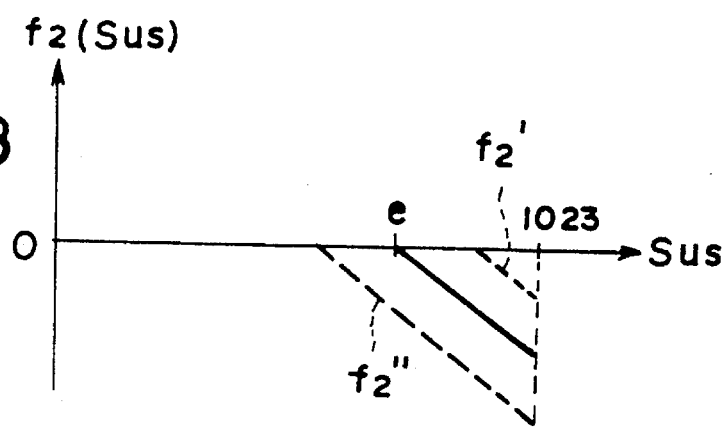
FIG. 7B
FIG. 8
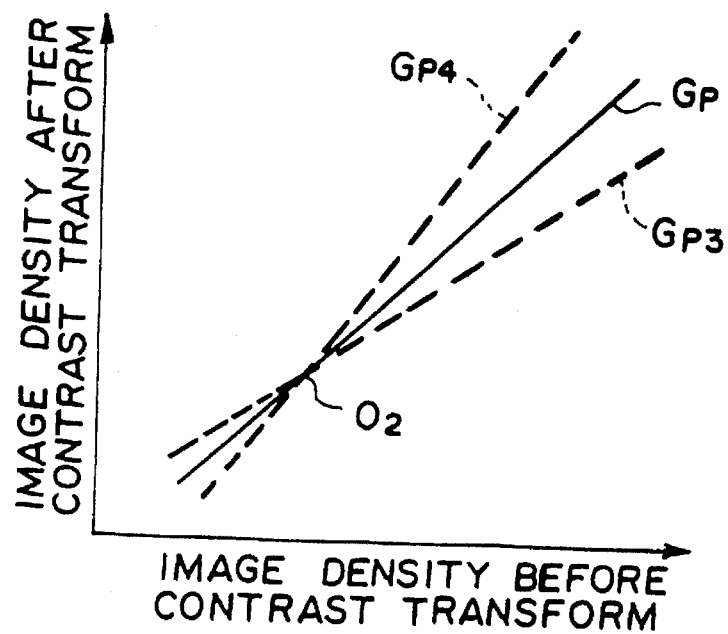

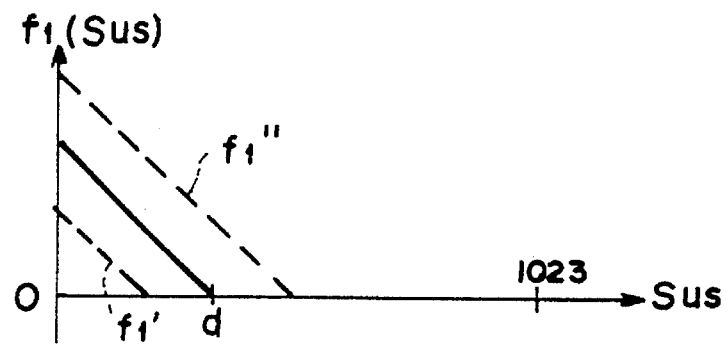
FIG. 9A
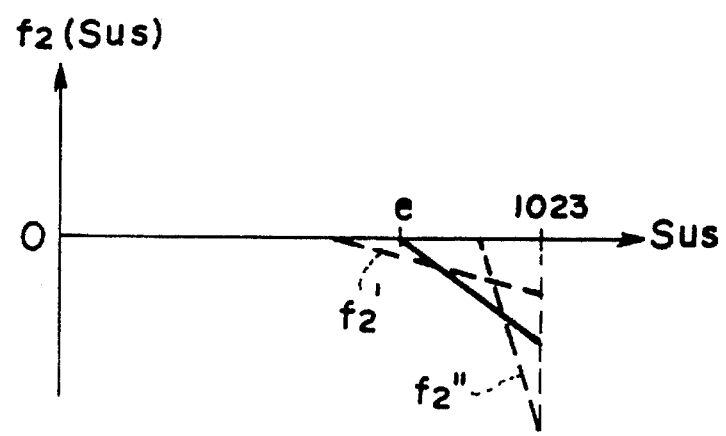
FIG. 9B
FIG. 10
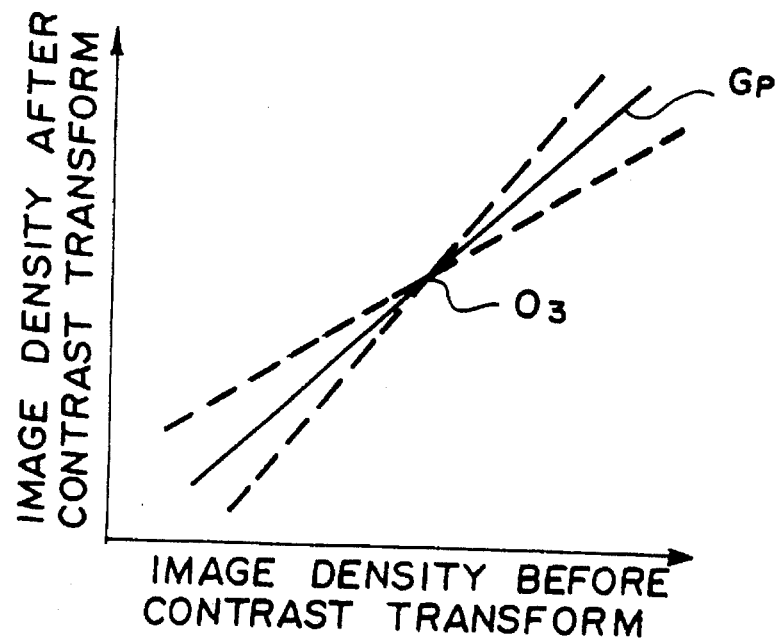

METHOD FOR COMPRESSING DYNAMIC RANGES OF IMAGES

BACKGROUND OF THE INVENTION

Field of the Invention

This invention relates to a method for compressing a dynamic range of an image, with which an original image signal representing an original image is processed, and a processed image signal representing an image having a narrower dynamic range than the original image is thereby generated.

Description of the Prior Art

Techniques for reading out a recorded radiation image in order to obtain an image signal, carrying out, appropriate image processing on the image signal, and then reproducing a visible image by use of the processed image signal have heretofore been known in various fields. For example, an X-ray image is recorded on an X-ray film having a small gamma value chosen according to the type of image processing to be carried out, the X-ray image is read out from the X-ray film and converted into an electric signal (i.e., an image signal), and the image signal is processed and then used for reproducing the X-ray image as a visible image on a photocopy, or the like. In this manner, a visible image having good image quality with high contrast, high sharpness, high graininess, or the like, can be reproduced.

Also, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material, such as photographic film.

In the image recording and reproducing systems, with which image signals are generated and visible images are reproduced from the image signals, it often occurs that portions of an image, which are to be used and therefore are required to have an appropriate image density in the reproduced image, have image density levels ranging widely from a low density to a high density. Also, it often occurs that what portions of an image having which range of image density are to be used and therefore are required to have an appropriate image density in the reproduced image. In such cases, the image signal representing the original image is processed such that the high-density parts of the original image may have an appropriate level of image density in the reproduced image. Also, the image signal representing the original image is processed such that the low-density parts of the original image may have an appropriate level of image density in the reproduced image. Thereafter, both the images reproduced from the image signals, which have thus been processed in different ways, are displayed side by side on a single display device.

However, if a plurality of images are displayed side by side on a single display device, the problems will occur in that the images inevitably become small in size and therefore hard to observe.

In order that parts of an image covering as wide a range of image density as possible can be used, the level of contrast of the parts of the image having a high or low image density or the level of contrast of the whole image has heretofore been rendered low such that the difference between the highest image density and the lowest image density may become small, i.e. such that the dynamic range of the image may become narrow.

However, if the level of contrast is rendered low, the problems will occur in that details of the image information in the image region, at which the level of contrast has been lowered, becomes hard to observe.

How the problems described above occur will be described hereinbelow.

FIG. 15 is a graph showing an example of how the values of the image signal components of an original image signal Sorg are distributed, which image signal components represent picture elements located along a certain direction (the direction indicated by the arrow x) on an original image. As a whole, the values of the image signal components of the original image signal Sorg are distributed in a step-like pattern along the direction indicated by the arrow x (i.e. the image density of the original image changes step-wise along the direction indicated by the arrow x). Each step part of the distribution of the image density includes a fine change having a comparatively high spatial frequency.

FIG. 16A is a graph showing an example of characteristics with which an original image signal Sorg representing an image is transformed into an image signal Sorg such that the dynamic range of the image may be compressed by lowering the level of contrast of part having a high image density. FIG. 16B is a graph showing how the values of the image signal components of the image signal Sorg' resulting from the transformation with the characteristics illustrated in FIG. 16A are distributed, which image signal components represent picture elements located along the direction indicated by the arrow x on the image.

In this example, the original image signal Sorg having values shown in FIG. 15 is transformed into the image signal Sorg' having values lying on the line A shown in FIG. 16A. As a result, as illustrated in FIG. 16B, the level of image density in the part having a high image density become low. Also, the level of contrast of the fine image structures represented by the fine change in each step part of the distribution of the image density, which step part falls within the high density region, becomes low. Therefore, the fine image structures having a high image density, which image structures are to be used and therefore are required to have good image quality in the reproduced image, become very hard to observe.

FIG. 17A is a graph showing an example of characteristics with which an original image signal Sorg representing an image is transformed into an image signal Sorg' such that the dynamic range of the image may be compressed by lowering the level of contrast of part having a low image density. FIG. 17B is a graph showing how the values of the image signal components of the image signal Sorg' resulting from the transformation with the characteristics illustrated in FIG. 17A are distributed, which image signal components represent picture elements located along the direction indicated by the arrow x on the image.

In this example, the original image signal Sorg having values shown in FIG. 15 is transformed into the image signal Sorg' having values lying on the line B shown in FIG. 17A. In such cases, as illustrated in FIG. 17B, the fine image structures having a low image density become very hard to observe.

Accordingly, a technique for compressing a dynamic range of an X-ray image of the chest of a human body has been proposed in, for example, "Journal of Japanese Society of Radiological Technology", Vol 45, No. 8, p. 1030, August 1989, Mitsuhiro Anan, et al. The proposed technique comprises the steps of:

1) calculating the values of an unsharp mask signal Sus,
2) doubling the values of the unsharp mask signal Sus, the resulting value being clipped at the maximum value (1,023) in cases where the resulting value exceeds the maximum value (1,023), $$a = \begin{array}{ll} 2 \times Sus & (2 \times Sus < 1,023) \\ 1,023 & (2 \times Sus \geq 1,023) \end{array}$$

3) calculating the values of an image signal representing a reversal image with the formula $$b=1,023-a$$

and 4) adding the products of the values of the image signal representing the reversal image and a coefficient, $\alpha$, to the values of the image signal representing the original image with the formula $$c = Sorg + \alpha \cdot b \quad (\alpha = .3)$$

The proposed technique has the effects of compressing the dynamic range of an image and keeping the contrast of fine image structures, which are present in each of parts having various levels of image density, high.

However, with the proposed technique, only the dynamic range of parts of the image, which parts have low levels of image density, can be compressed. With the proposed technique, the dynamic range of parts of the image, which parts have high levels of image density, cannot be compressed. Therefore, the proposed technique has the drawback in that it is not suitable for images of bones of limbs, or the like. Also, the proposed technique has the risk that an artificial contour may occur in a visible image reproduced from the processed image signal and adversely affects the image quality of the visible image.

Accordingly, in U.S. patent application 08/225,343 now pending, which is a continuation of U.S. patent application No. 08/093,991, the applicant proposed a method for compressing a dynamic range of an image, comprising the steps of:

i) calculating the value of an unsharp mask signal Sus corresponding to each of picture elements in an original image by averaging the values of image signal components of an original image signal Sorg representing the original image, which image signal components represent the picture elements belonging to a predetermined region surrounding each of the picture elements, and ii) processing the original image signal with the formula $$Sproc = Sorg + f_1(Sus) \quad (1)$$

where $f_1(Sus)$ represents a function, the value of which decreases monotonously as the value of the unsharp mask signal Sus increases, whereby the values of a processed image signal Sproc representing an image having a narrower dynamic range than the original image is generated.

With the proposed method, both the dynamic range of parts of the image, which parts have low levels of image density, and the dynamic range of parts of the image, which have high levels of image density, can be compressed. Also, in cases where the differential coefficient of the function $f_1(Sus)$ is continuous, no artificial contour occurs in the image represented by the processed image signal Sproc. In this manner, the range of image density of the image can be compressed such that parts of the image covering a wide range of image density can be used and may have good image quality in the reproduced visible image, and the image quality of fine image structures at each of parts having various levels of image density may be kept good.

However, with the method disclosed in U.S. patent application No. 08/225,343 now pending, the function $f_1(Sus)$ for calculating the processed image signal Sproc is fixed for every kind of image signal, and the contrast of the image is not taken into consideration. Therefore, as for an image signal representing an image, which has a wider dynamic range and a higher level of contrast than ordinarily processed images, appropriate compression images, appropriate compression of the dynamic range cannot be carried out, and the contrast of the parts of the image, which parts have high levels of image density, or the contrast of the parts of the image, which parts have low levels of image density, or the contrast of the entire area of the image cannot be lowered appropriately.

SUMMARY OF THE INVENTION

The primary object of the present invention is to provide a method for compressing a dynamic range of an image, wherein the compression of the dynamic range of an image is carried out appropriately even for an image having a level of contrast different from ordinary levels of contrast.

Another object of the present invention is to provide a method for compressing a dynamic range of an image, wherein an image signal representing the image is processed such that no artificial contour may occur in the visible image reproduced from the processed image signal.

The present invention provides a first method for compressing a dynamic range of an image, comprising the steps of:

i) calculating the value of an unsharp mask signal Sus corresponding to each of picture elements in an original image by averaging the values of image signal components of an original image signal Sorg representing the original image, which image signal components represent the picture elements belonging to a predetermined region surrounding each of the picture elements, and ii) processing the original image signal Sorg with the formula $$Sproc = Sorg + f_1(Sus)$$

where $f_1(Sus)$ represents a function, the value of which decreases monotonously as the value of the unsharp mask signal Sus increases, whereby the values of a processed image signal Sproc representing an image having a narrower dynamic range than the original image is generated, wherein the improvement comprises the steps of:

a) calculating the contrast of the original image signal Sorg from the values of the original image signal Sorg, and b) determining a signal range, to which the function $f_1(Sus)$ is applied, and/or the level of the value of the function $f_1(Sus)$ in accordance with the level of the contrast of the original image signal Sorg.

The term "signal range to which a function $f_1(Sus)$ is applied" as used herein means the range of the image density region of the image signal, which is processed with the function $f_1(Sus)$. The term "level of a value of a function $f_1(Sus)$" as used herein means the degree of emphasis of the image signal.

The present invention also provides a second method for compressing a dynamic range of an image, wherein at least a portion of the function $f_1(Sus)$, the value of which decreases monotonously, contains a curve.

The value of the function $f_1(Sus)$ need not necessarily change for every value of the unsharp mask signal Sus, and may not change for a certain range of values of the unsharp mask signal Sus.

With the first and second methods for compressing a dynamic range of an image in accordance with the present invention, the signal range, to which the function $f_1(Sus)$ is applied in order to compress the dynamic range of the image, and/or the level of the value of the function $f_1(Sus)$ is determined in accordance with the level of the contrast of the original image signal Sorg. In cases where the image to be processed has a higher level of contrast than ordinarily processed images, the signal range, to which the function $f_1(Sus)$ is applied, is widened, and/or the level of the value of the function $f_1(Sus)$ is set at a high level. In cases where the image to be processed has a lower level of contrast than ordinarily processed images, the signal range, to which the function $f_1(Sus)$ is applied, is narrowed, and/or the level of the value of the function $f_1(Sus)$ is set at a low level. In this manner, the range of image density of the image can be compressed such that parts of the image covering a wide range of image density can be used and may have good image quality in the reproduced visible image. Therefore, a processed image, which has good image quality and can serve as an effective tool in, particularly, the efficient and accurate diagnosis of an illness, can be obtained in accordance with the level of the contrast of the original image.

With the second method for compressing a dynamic range of an image in accordance with the present invention, wherein at least a portion of the function $f_1(Sus)$ contains a curve, no artificial contour occurs in the visible image reproduced from the processed image signal Sproc. Therefore, a processed image, which has better image quality and can serve as a more effective tool in, particularly, the efficient and accurate diagnosis of an illness, can be obtained.

As described above, with the first and second methods for compressing a dynamic range of an image in accordance with the present invention, the signal range, to which the function $f_1(Sus)$ is applied in order to compress the dynamic range of the image, and/or the level of the value of the function $f_1(Sus)$ is determined in accordance with the level of the contrast of the original image signal Sorg. Therefore, the dynamic range of the parts of the image, which parts have high levels of image density, or the dynamic range of the parts of the image, which parts have low levels of image density, or the dynamic range of the entire area of the image can be lowered appropriately regardless of the level of the contrast of the original image. In this manner, the range of image density of the image can be compressed such that parts of the image covering a wide range of image density can be used and may have good image quality in the reproduced visible image.

BRIEF DESCRIPTION OF THE DRAWINGS

FIG. 1 is a schematic view showing an example of an X-ray image recording apparatus, FIG. 2 is a perspective view showing an example of an X-ray image read-out apparatus, FIGS. 5A and 5B are graphs showing examples of monotonously decreasing functions, in which the value of an unsharp mask signal Sus serves as a variable, FIG. 6 is a graph showing a different example of contrast of an original image signal Sorg, FIGS. 7A and 7B are graphs showing different examples of monotonously decreasing functions, in which the value of an unsharp mask signal Sus serves as a variable, FIG. 8 is a graph showing a further example of contrast of an original image signal Sorg, FIGS. 9A and 9B are graphs showing further examples of monotonously decreasing functions, in which the value of an unsharp mask signal Sus serves as a variable, FIG. 10 is a graph showing a still further example of contrast of an original image signal Sorg.

DESCRIPTION OF THE PREFERRED EMBODIMENTS

Figure 3:
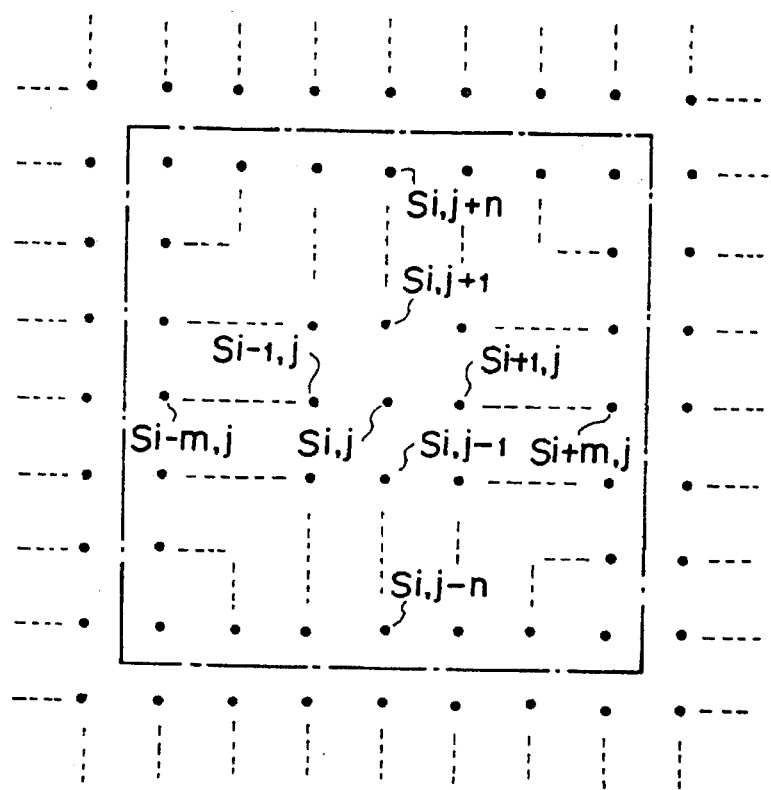
FIG. 3 is an explanatory view showing picture elements in an original image and image signal components of an original image signal Sorg, which represent the picture elements.

The present invention will hereinbelow be described in further detail with reference to the accompanying drawings.

In the embodiments described below, an X-ray image is stored on a stimulable phosphor sheet.

FIG. 1 is a schematic view showing an example of an X-ray image recording apparatus.

With reference to FIG. 1, X-rays 12 are produced by an X-ray source 11 of an X-ray image recording apparatus and irradiated to an object 13. The X-rays, which have passed through the object 13, impinge upon a stimulable phosphor sheet 14. In this manner, an X-ray image of the object 13 is stored on the stimulable phosphor sheet 14.

FIG. 2 is a perspective view showing an example of an X-ray image read-out apparatus.

With reference to FIG. 2, a stimulable phosphor sheet 14, on which an X-ray image has been stored in the X-ray image recording apparatus shown in FIG. 1, is placed at a predetermined position in a read-out means 20.

The stimulable phosphor sheet 14 is then conveyed in a sub-scanning direction, which is indicated by the arrow Y, by an endless belt 22, which is operated by a motor 21. A laser beam 24, which serves as stimulating rays, is produced by a laser beam source 23. The laser beam 24 is reflected and deflected by a rotating polygon mirror 26, which is quickly rotated by a motor 25 in the direction indicated by the arrow. The laser beam 24 then passes through a converging lens 27, which may be constituted of an fθ lens, or the like. The direction of the optical path of the laser beam 24 is then changed by a mirror 28, and the laser beam 24 impinges upon the stimulable phosphor sheet 14 and scans it in a main scanning direction indicated by the arrow X, which direction is approximately normal to the sub-scanning direction indicated by the arrow Y. When the stimulable phosphor sheet 14 is exposed to the laser beam 24, the exposed portion of the stimulable phosphor sheet 14 emits light 29 in an amount proportional to the amount of energy stored thereon during its exposure to the X-rays. The emitted light 29 is guided by a light guide member 30 and photoelectrically detected by a photomultiplier 31. The light guide member 30 is made from a light guiding material, such as an acrylic plate. The light guide member 30 has a linear light input face 30a, which is positioned so that it extends along the main scanning line on the stimulable phosphor sheet 14, and a ring-shaped light output face 30b, which is positioned so that it is in close contact with a light receiving face of the photomultiplier 31. The emitted light 29, which has entered the light guide member 30 at its light input face 30a, is guided through repeated total reflection inside of the light guide member 30, emanates from the light output face 30b, and is received by the photomultiplier 31. In this manner, the amount of the emitted light 29, which amount represents the X-ray image, is converted into an electric signal by the photomultiplier 31.

An analog output signal SO is generated by the photomultiplier 31. The analog output signal SO is logarithmically amplified by a logarithmic amplifier 32, and digitized by an A/D converter 33. In this manner, an original image signal Sorg is obtained. The original image signal Sorg is then fed into an image processing and reproducing means 40. The image processing and reproducing means 40 is constituted of a CRT display device 41 which reproduces and displays a visible image, a main body 42 in which a CPU, an internal memory, an interface, or the like, are incorporated, a floppy disk drive unit 43 which operates a floppy disk, and a keyboard 44 from which necessary information is fed into the X-ray image read-out apparatus.

After the original image signal Sorg representing the original X-ray image of the object 13 is fed into the image processing and reproducing means 40, the dynamic range of the image is compressed by transforming the original image signal Sorg in the manner described below.

FIG. 3 is an explanatory view showing picture elements in an original image and image signal components of an original image signal Sorg, which represent the picture elements. In FIG. 3, dots represent the picture elements, and the symbols, such as $S_{ij}$, represent the image signal components of the original image signal Sorg which represent the corresponding picture elements. The value of an unsharp mask signal $Sus_{ij}$ for the picture element, which is located in the middle of the region surrounded by the chained line, is calculated with the formula $$Sus_{ij} = \frac{\sum_{k=-m}^{m} \sum_{l=-n}^{n} S_{i+k, j+l}}{(2m+1) \cdot (2n+1)}$$

By carrying out the calculation for every picture element, an unsharp mask signal Sus for the whole image is generated. The values of m and n are determined arbitrarily in accordance with the intervals, with which the original image signal Sorg is sampled, the characteristics of the original X-ray image, or the like.

Figure 4:
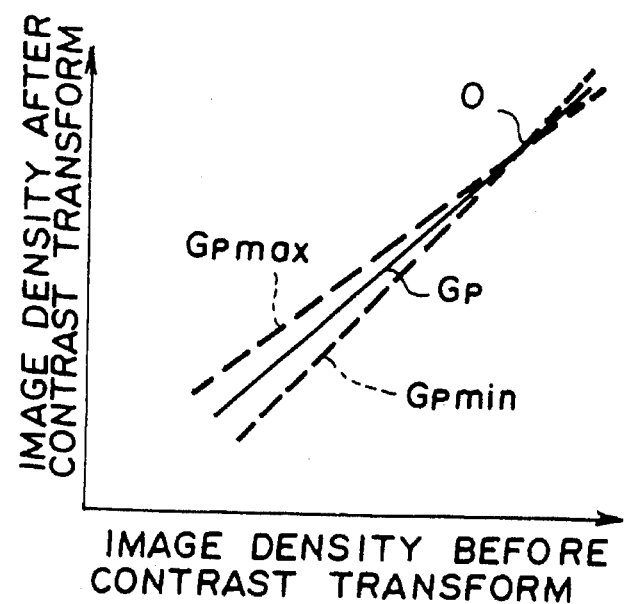
FIG. 4 is a graph showing an example of contrast of an original image signal Sorg.

Also, the contrast of the original image signal Sorg is calculated. FIG. 4 is a graph showing an example of contrast Gp of an original image signal Sorg in terms of the relationship between the image density of the image before being subjected to contrast transformation and the image density of the image after being subjected to the contrast transformation. In accordance with the contrast Gp shown in FIG. 4, the image before being subjected to contrast transformation is reproduced as the image, which has been subjected to the contrast transformation and has a predetermined image density region. The contrast Gp is limited such that it may fall within a predetermined range (Gpmin ≦ Gp ≦ Gpmax) with the point O on the high density side being fixed.

FIGS. 5A and 5B are graphs showing examples of monotonously decreasing functions, in which the value of an unsharp mask signal Sus serves as a variable.

The maximum value of the unsharp mask signal Sus is 1,023. A function $f_1(Sus)$ shown in FIG. 5A has the characteristics such that the value of the function $f_1(Sus)$ changes when the unsharp mask signal Sus takes a small value, and such that the value of the function $f_1(Sus)$ is zero when the value of the unsharp mask signal Sus is larger than d. A function $f_2(Sus)$ shown in FIG. 5B has the characteristics such that the value of the function $f_2(Sus)$ is zero when the value of the unsharp mask signal Sus falls within the range of zero to e, and such that the function $f_2(Sus)$ takes values lying on the inclined straight line when the value of the unsharp mask signal Sus is larger than e. For each picture element (i,j), a calculation using the function $f_1(Sus)$ and/or the function $f_2(Sus)$ is carried out with the formula $$Sproc_{ij} = S_{ij} + f_k(Sus_{ij}) \text{ (where } k=1, 2\text{)} \quad (3)$$

In this manner, a processed image signal Sproc corresponding to all of the picture elements in the image is generated.

As described above, the contrast Gp shown in FIG. 4 is limited such that it may fall within the predetermined range (Gpmin ≦ Gp ≦ Gpmax). However, for a different image, it will often occur that the contrast Gp falls outside of the predetermined range. In such cases, the signal range, to which the function $f_1$(Sus) shown in FIG. 5A and/or the function $f_2$(Sus) shown in FIG. 5B is applied, and/or the level of the value of the function $f_1$(Sus) and/or the function $f_2$(Sus) is varied in accordance with the calculated contrast Gp, and the processing for compressing the dynamic range is thereby carried out.

For example, as illustrated in FIG. 6, in cases where the calculated contrast is obtained as indicated by contrast Gp1 wherein Gp1 > Gpmax, the contrast as a whole becomes slightly compressed, and the image density of the image after being subjected to the contrast transformation becomes high. Therefore, in such cases, as illustrated in FIGS. 7A and 7B, a function $f_1'$ is employed as the function $f_1$(Sus), and/or a function $f_2'$ is employed as the function $f_2$(Sus). Specifically, as indicated by the function $f_1'$, the signal range, to which the function $f_1$(Sus) is applied, is widened, and the level of the value of the function $f_1$(Sus) is set at a low level. Also, as indicated by the function $f_2'$, the signal range, to which the function $f_2$(Sus) is applied, is narrowed. In this manner, the degree of compression is reduced, and the compression of the dynamic range is thereby carried out.

Also, as illustrated in FIG. 6, in cases where the calculated contrast is obtained as indicated by contrast Gp2 wherein Gp2 < Gpmin, the contrast as a whole becomes slightly extended, and the image density of the image after being subjected to the contrast transformation becomes low. Therefore, in such cases, as illustrated in FIGS. 7A and 7B, a function $f_1''$ is employed as the function $f_1$(Sus), and/or a function $f_2''$ is employed as the function $f_2$(Sus). Specifically, as indicated by the function $f_1''$, the signal range, to which the function $f_1$(Sus) is applied, is narrowed, and the level of the value of the function $f_1$(Sus) is set at a high level Also, as indicated by the function $f_2''$, the signal range, to which the function $f_2$(Sus) is applied, is widened. In this manner, the degree of compression is increased, and the compression of the dynamic range is thereby carried out.

As described above, the signal range, to which the function $f_1$(Sus) and/or the function $f_2$(Sus) is applied, and/or the level of the value of the function $f_1$(Sus) and/or the function $f_2$(Sus) is changed in accordance with the level of the contrast Gp obtained from the original image signal Sorg. In this manner, the processing for compressing the dynamic range can be carried out in accordance with the difference between the maximum image density and the minimum image density of the original image.

In an example shown in FIG. 8, the contrast Gp is limited such that it may fall within a predetermined range (Gpmin ≦ Gp ≦ Gpmax) with the point $O_2$ on the low density side being fixed. In this example, in cases where the calculated contrast is obtained as indicated by contrast Gp3 wherein Gp3 > Gpmax, the contrast as a whole becomes slightly compressed, and the image density of the image after being subjected to the contrast transformation becomes low. Therefore, in such cases, as illustrated in FIGS. 9A and 9B, a function $f_1'$ is employed as the function $f_1$(Sus), and/or a function $f_2'$ is employed as the function $f_2$(Sus). Specifically, as indicated by the function $f_1'$, the signal range, to which the function $f_1$(Sus) is applied, is narrowed. Also, as indicated by the function $f_2'$, the signal range to which the function $f_2$(Sus) is applied, is widened, and the level of the value of the function $f_2$(Sus) is set at a low level. In this manner, the degree of compression is reduced, and the compression of the dynamic range is thereby carried out.

Also, as illustrated in FIG. 8, in cases where the calculated contrast is obtained as indicated by contrast Gp4 wherein Gp4 < Gpmin, the contrast as a whole becomes slightly extended, and the image density of the image after being subjected to the contrast transformation becomes high. Therefore, in such cases, as illustrated in FIGS. 9A and 9B, a function $f_1''$ is employed as the function $f_1$(Sus), and/or a function $f_2''$ is employed as the function $f_2$(Sus). Specifically, as indicated by the function $f_1''$, the signal range, to which the function $f_1$(Sus) is applied, is widened. Also, as indicated by the function $f_2''$, the signal range, to which the function $f_2$(Sus) is applied, is narrowed, and the level of the value of the function $f_2$(Sus) is set at a high level. In this manner, the degree of compression is increased, and the compression of the dynamic range is thereby carried out.

In an example shown in FIG. 10, the contrast Gp is limited such that it may fall within a predetermined range (Gpmin ≦ Gp ≦ Gpmax) with the point $O_3$ at an approximately middle density position being fixed. In such cases, as the function $f_1$(Sus) for raising the image density on the low density side, the functions shown in FIG. 7A may be employed. Also, as the function $f_2$(Sus) for lowering the image density on the high density side, the functions shown in FIG. 9B may be employed. In this manner, the function $f_1$(Sus) may be changed as indicated by the functions $f_1'$ and $f_1''$ in accordance with the level of the contrast Gp. Also, the function $f_2$(Sus) may be changed as indicated by the functions $f_2'$ and $f_2''$ in accordance with the level of the contrast Gp.

In the embodiments described above, the two functions $f_1$(Sus) and $f_2$(Sus) are employed as the functions for carrying out the processing for compressing the dynamic range. Alternatively, only either one of the functions may be employed.

Figure 11:
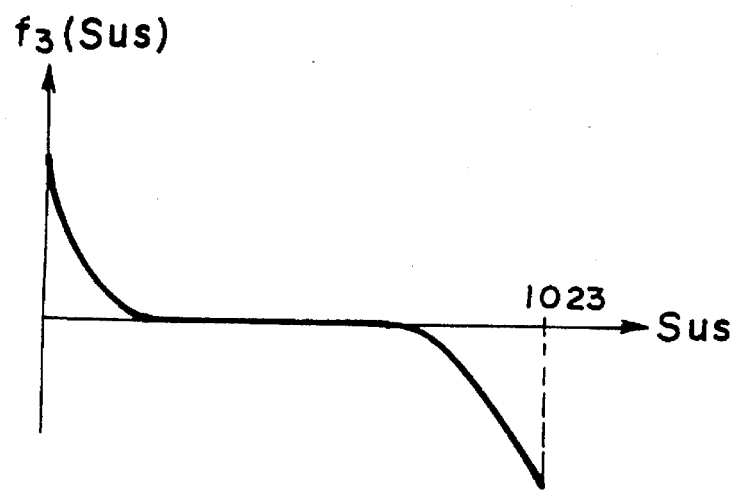
FIG. 11 is a graph showing a still further example of a monotonously decreasing function, in which the value of an unsharp mask signal Sus serves as a variable.
Figure 12:
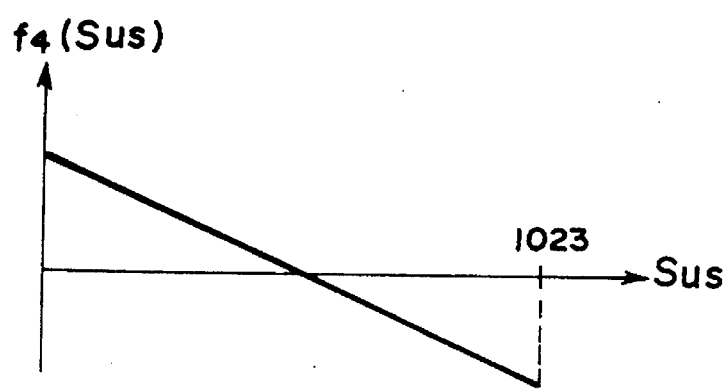
FIG. 12 is a graph showing a different example of a monotonously decreasing function, in which the value of an unsharp mask signal Sus serves as a variable.
Figure 13:
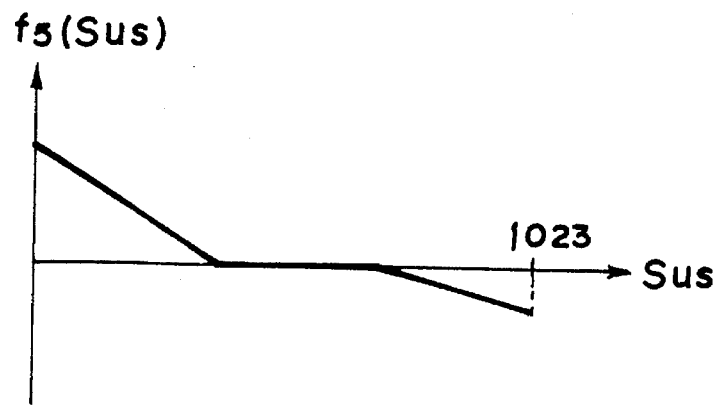
FIG. 13 is a graph showing a further example of a monotonously decreasing function, in which the value of an unsharp mask signal Sus serves as a variable.
Figure 14:
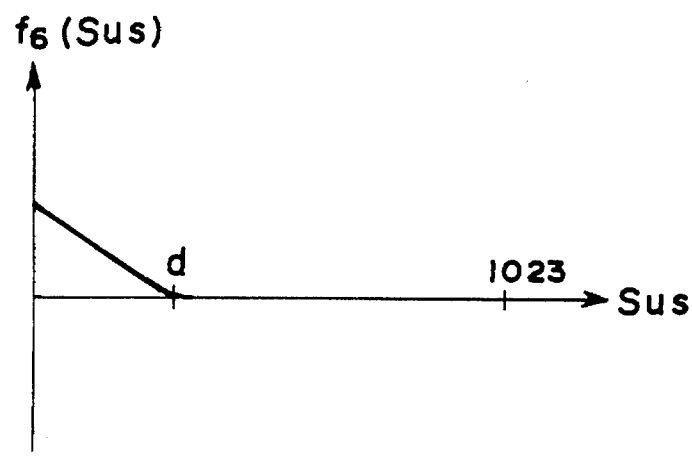
FIG. 14 is a graph showing a still further example of a monotonously decreasing function, in which the value of an unsharp mask signal Sus serves as a variable.
Figure 15:
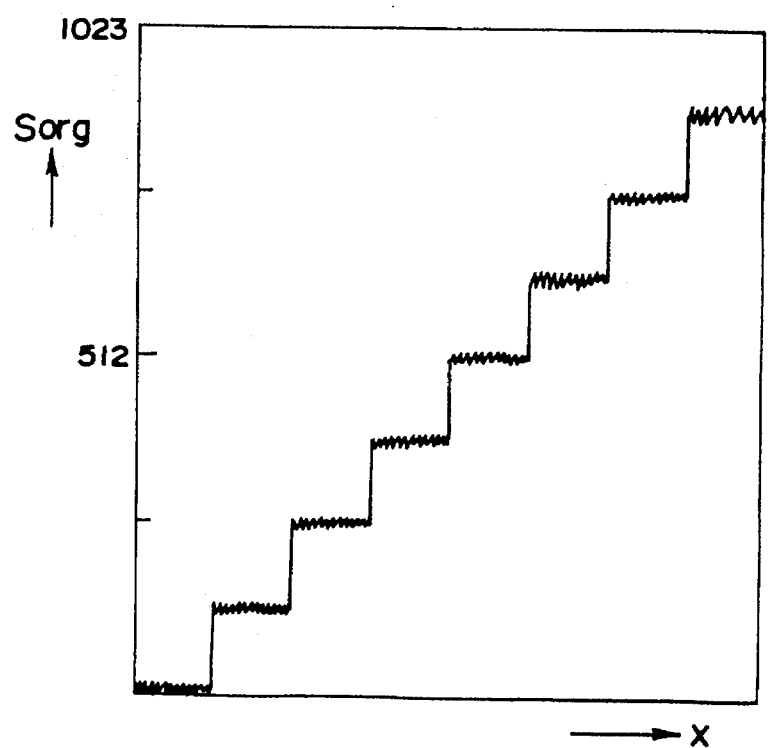
FIG. 15 is a graph showing an example of how the values of the image signal components of an original image signal Sorg are distributed, which image signal components represent picture elements located along a certain direction (the direction indicated by the arrow x) on an original image.
Figure 16A:
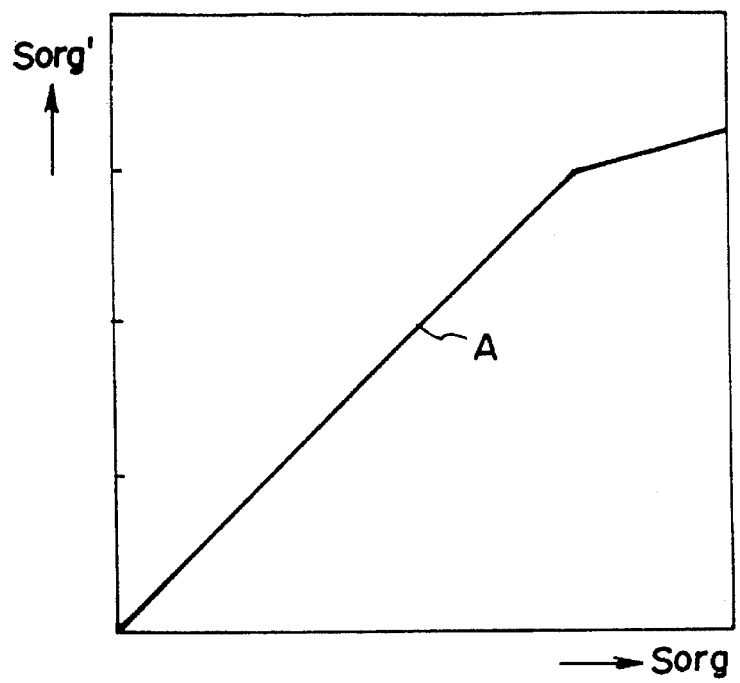
FIG. 16A is a graph showing an example of characteristics with which an original image signal Sorg representing an image is transformed into an image signal Sorg' such that the dynamic range of the image may be compressed by lowering the level of contrast of part having a high image density.
Figure 16B:
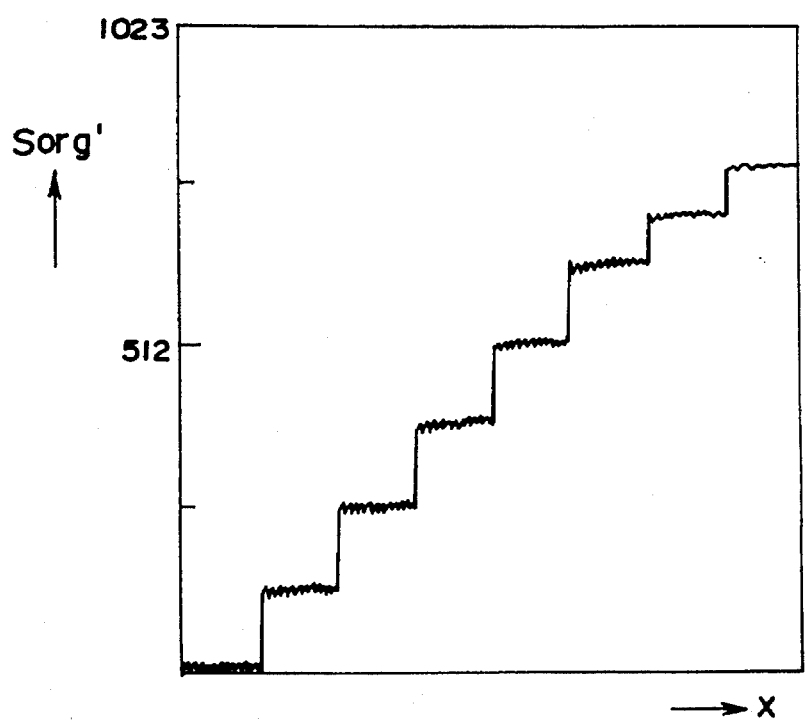
FIG. 16B is a graph showing how the values of the image signal components of the image signal Sorg' resulting from the transformation with the characteristics illustrated in FIG. 16A are distributed, which image signal components represent picture elements located along the direction indicated by the arrow x on the image.
Figure 17A:
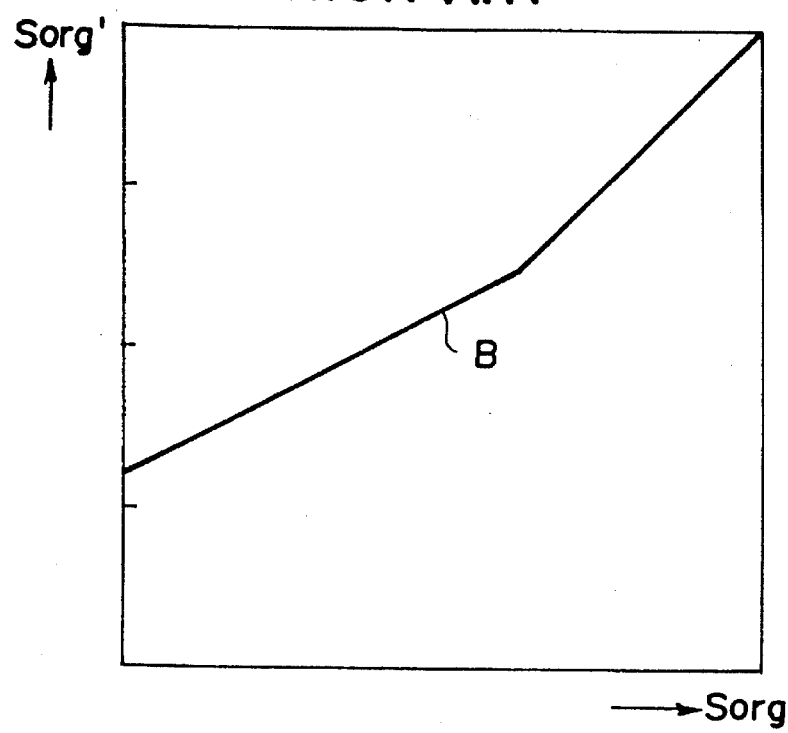
FIG. 17A is a graph showing an example of characteristics with which an original image signal Sorg representing an image is transformed into an image signal Sorg' such that the dynamic range of the image may be compressed by lowering the level of contrast of part having a low image density.
Figure 17B:
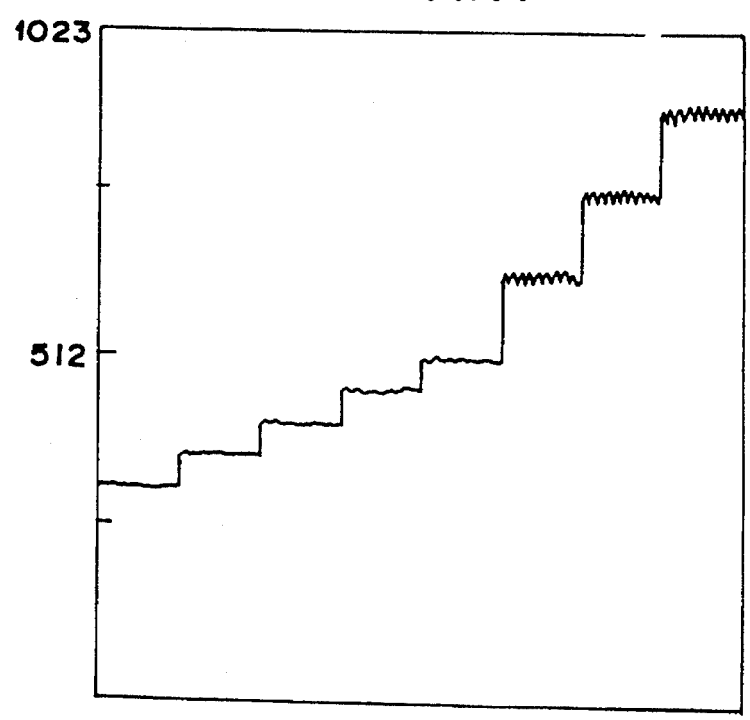
FIG. 17B is a graph showing how the values of the image signal components of the image signal Sorg' resulting from the transformation with the characteristics illustrated in FIG. 17A are distributed, which image signal components represent picture elements located along the direction indicated by the arrow x on the image.

Also, the function for carrying out the processing for compressing the dynamic range is not limited to the functions $f_1$(Sus) and $f_2$(Sus). For example, as indicated by a function $f_3$(Sus) in FIG. 11, portions of the function may contain curves. As another example, as indicated by a function $f_4$(Sus) in FIG. 12, the function may contain a portion at which the value of the function $f_4$(Sus) does not become zero. As a further example, as illustrated in FIG. 13, a function $f_5$(Sus) may be employed, in which the degree of compression becomes high on the low image density side and the high image density side. As a still further example, as indicated by a function $f_6$(Sus) in FIG. 14, the line representing the function $f_6$(Sus) may not be folded sharply at the point, d, at which the value of the function $f_6$(Sus) becomes zero, but the differential coefficient of the function $f_6$(Sus) may be continuous at the point, d. In cases where a function is used, which has characteristics such that the line representing it folds sharply at the point, d, even if no particular contour is present in the original image, an artificial contour will occur at the part having the image density corresponding to the point, d, in the visible image reproduced from the processed image signal Sproc. In cases where the function f6(Sus) is employed which has characteristics such that the differential coefficient is continuous at the point, d, no artificial contour occurs in the reproduced visible image.

In the embodiments described above, an X-ray image is read out from a stimulable phosphor sheet, and an image signal is thereby generated. The method for compressing a dynamic range of an image in accordance with the present invention is broadly applicable when image signals are detected from various kinds of recording media, on which images have been recorded, e.g. when an X-ray image is read out from X-ray film.

What is claimed is:

1. A method for compressing a dynamic range of an image, comprising the steps of:

applying an original image signal Sorg which represents an original image of an object to an image processing means;

calculating a contrast of the original image signal Sorg by using the image processing means;

calculating the value of an unsharp mask signal Sus corresponding to each of picture elements in an original image by averaging the values of image signal components of the original image signal Sorg representing the original image, which image signal components represent the picture elements belonging to a predetermined region surrounding each of the picture elements, by using the image processing means;

determining a range of image density of the original image to which a function $f_1(Sus)$ is to be applied in accordance with the level of contrast of the original image signal Sorg, by using the image processing means;

determining a value of the function $f_1(Sus)$, the value of which decreases monotonously as the value of the unsharp mask signal Sus increases, in accordance with the level of the contrast of the original image signal Sorg, by using the image signal processing means;

processing the original image signal Sorg with the formula $$Sproc = Sorg + f_1(Sus)$$

whereby the values of a processed image signal Sproc representing an image having a narrower dynamic range than the original image is generated, said processing being performed by the image signal processing means;

applying the processed image signal Sproc to an image reproducing means;

reproducing a visible image in accordance with the processed image signal Sproc, using said image reproducing means.

2. A method as defined in claim 1 wherein at least a portion of the function $f_1(Sus)$, the value of which decreases monotonously, contains a curve.

3. A method as defined in claim 1 wherein the original image is a radiation image.

4. A method as defined in claim 3 wherein the radiation image has been stored on a stimulable phosphor sheet.

5. A method as defined in claim 4 further comprising the steps of:

exposing the stimulable phosphor sheet to stimulating rays, thereby causing the stimulable phosphor sheet to emit light in proportion to an amount of energy stored thereon during its exposure to radiation, said emitted light representing the radiation image;

photoelectrically detecting the emitted light; and outputting a signal in accordance with said detected light which represents the radiation image and serves as the original image signal Sorg.

6. A method as defined in claim 5 wherein said stimulating rays are a laser beam.

7. A method as defined in claim 1 wherein the original image is an X-ray image which has been recorded on photographic film.

8. A method as defined in claim 1, wherein the image processing means is a digital computer.

9. An apparatus for compressing a dynamic range of an image, comprising:

means for receiving an original image signal Sorg which represents an original image of an object;

means for calculating the contrast of the original image signal Sorg;

means for calculating the value of an unsharp mask signal Sus corresponding to each of picture elements in the original image signal Sorg by averaging the values of image signal components of the original image signal Sorg, which image signal components represent the picture elements belonging to a predetermined region surrounding each of the picture elements;

means for determining a range of image density of the original image to which a function $f_1(Sus)$ is to be applied in accordance with the level of the contrast of the original image signal Sorg;

means for determining a value of the function $f_1(Sus)$, the value of which decreases monotonously as the value of the unsharp mask signal Sus increases, in accordance with the level of the contrast of the original image signal Sorg;

means for processing the original image signal Sorg in the determined range of image density according to the formula $$Sproc = Sorg + f_1(Sus)$$

whereby the values of a processed image signal Sproc representing an image having a narrower dynamic range than the original image is generated;

means for reproducing and displaying a visible image in accordance with said processed signal Sproc.

10. An apparatus as claimed in claim 9, wherein at least a portion of the function $f_1(Sus)$, the value of which decreases monotonously, contains a curve.

11. An apparatus as claimed in claim 10, wherein the original image is a radiation image.

12. An apparatus as claimed in claim 11, wherein the radiation image has been stored on a stimulable phosphor sheet.

13. An apparatus as claimed in claim 12, further comprising:

means for exposing the stimulable phosphor sheet to stimulating rays, causing the stimulable phosphor sheet to emit light in proportion to the amount of energy stored thereon during its exposure to radiation, said emitted light representing the radiation image; and means for photoelectrically detecting the emitted light and for outputting a signal in accordance with said detected light which represents the radiation image and serves as the original image signal Sorg.

14. An apparatus as claimed in claim 13, wherein said stimulating rays are a laser beam.

15. An apparatus as claimed in claim 9, wherein the original image is an X-ray image which has been recorded on photographic film.

16. An apparatus as claimed in claim 9, wherein the image processing means is a digital computer.

* * * * *